(12) United States Patent
Utsugi et al.

(10) Patent No.: US 9,841,731 B2
(45) Date of Patent: Dec. 12, 2017

(54) HOLOGRAPHIC MEMORY DEVICE

(71) Applicant: Hitachi-LG Data Storage, Inc., Tokyo (JP)

(72) Inventors: Takeru Utsugi, Tokyo (JP); Kazuyoshi Yamazaki, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 148 days.

(21) Appl. No.: 14/816,441

(22) Filed: Aug. 3, 2015

(65) Prior Publication Data
US 2016/0041525 A1 Feb. 11, 2016

(30) Foreign Application Priority Data

Aug. 8, 2014 (JP) ................................. 2014-162033

(51) Int. Cl.
*G03H 1/26* (2006.01)
*G02B 5/32* (2006.01)
(Continued)

(52) U.S. Cl.
CPC .............. *G03H 1/265* (2013.01); *G02B 5/32* (2013.01); *G02B 27/0927* (2013.01);
(Continued)

(58) Field of Classification Search
CPC .. G02B 5/32; G02B 27/0037; G02B 27/0927; G02B 27/0944; G02B 27/1093; G11C 13/042; G11C 13/045–13/046; G03H 1/0248; G03H 1/0406; G03H 1/0443; G03H 1/265; G03H 1/28; G03H 2001/0473; G03H 2223/17; G03H 2223/18; G03H 2223/23; G06K 7/1094; G06K 19/06065; G06K 19/16; G06K 2019/0629;
(Continued)

(56) References Cited

U.S. PATENT DOCUMENTS 5,513,121 A * 4/1996 Sugawara ................. G11B 7/22
369/112.28
7,852,538 B2 12/2010 Kanesaka et al.
(Continued)

FOREIGN PATENT DOCUMENTS

JP 2006-78942 A 3/2006

*Primary Examiner* — Stephone B Allen
*Assistant Examiner* — James McGee
(74) *Attorney, Agent, or Firm* — Mattingly & Malur, PC

(57) ABSTRACT

To reduce an influence of stray light and stably record/reproduce high-quality data in holographic recording/reproduction. A holographic memory device includes an optical system that guides a reference beam to an optical information recording medium at a desired angle of incidence, a control part that controls the angle of incidence of the reference beam generated in the optical system, and a lens part that images the reference beam in a desired position of the optical information recording medium. Further, at least a first light beam at a first angle and a second light beam at a second angle different from the first angle are output from the optical element, and the optical element is provided so that the first light beam may propagate within an effective diameter of the lens part and the second light beam may propagate to an outside of the effective diameter of the lens part.

7 Claims, 18 Drawing Sheets

(51) Int. Cl.
  *G02B 27/09* (2006.01)
  *G11B 7/0065* (2006.01)
  *G11B 7/085* (2006.01)
  *G11B 7/1353* (2012.01)
  *G11B 7/1359* (2012.01)

(52) U.S. Cl.
  CPC ........ *G02B 27/0944* (2013.01); *G11B 7/0065* (2013.01); *G11B 7/08564* (2013.01); *G11B 7/1353* (2013.01); *G11B 7/1359* (2013.01); *G03H 2223/18* (2013.01); *G03H 2223/23* (2013.01)

(58) Field of Classification Search
  CPC .......... G06K 2207/1015; G11B 7/0065; G11B 7/083; G11B 7/08564; G11B 7/1353–7/1359; G11B 7/1372; G11B 7/1374–7/1376; G11B 7/13922; G11B 7/1395; G11B 2007/00653–2007/00656; G11B 2007/13727
  USPC ................. 359/15–16, 24, 31; 369/102, 103, 369/109.01–109.02, 112.03, 112.05, 369/112.1, 112.15, 112.28; 365/124–125, 365/215–216, 234–235
  See application file for complete search history.

(56) References Cited

U.S. PATENT DOCUMENTS

| | | | |
|---|---|---|---|
| 2005/0146762 A1* | 7/2005 | Hoogland | G02B 5/04 359/35 |
| 2010/0054103 A1* | 3/2010 | Tatsuta | G03H 1/26 369/103 |
| 2014/0043952 A1 | 2/2014 | Nagayoshi et al. | |

* cited by examiner

HOLOGRAPHIC MEMORY DEVICE

BACKGROUND OF THE INVENTION

Field of the Invention

The present invention relates to a holographic memory device that records information as holograms in optical information recording media and/or reproduces information from optical information recording media.

Description of the Related Art

As a background art of the technological field, there is US 2014-0043952 (Patent Document 1). This document discloses use of a wedge prism having a reflection film rotationally controlled by a galvano motor and having a tilted optical surface for optimization of a luminous flux diameter of a reference beam.

Further, there is JP-A-2006-78942 (Patent Document 2). This document discloses that "a diffraction grating 111 and a hologram recording material 14 are provided in an imaging relationship with each other via a telecentric optical system including lenses 12, 13, and thereby, even when the angle of incidence of a reference beam 200 is changed by the diffraction grating 111 and the angle of incidence to the hologram recording material 14 is changed, the exposed area of the hologram recording material 14 exposed to the reference beam 200 may be made constant because the diffraction grating 111 and the hologram recording material 14 have the imaging relationship. In addition, this effect may be realized without damage on the fast scan speed and the small and light configuration or without mechanical wear.

A holographic memory system causes interference between a signal beam and a reference beam and records its interference pattern as a hologram in an optical information recording medium. For example, in the double-luminous flux angular multiplexing system, multiplexing recording of holograms is performed while changing the angle of incidence of the reference beam in the same position within the optical information recording medium. Further, at reproduction, the reference beam is allowed to enter the optical information recording medium at the same angle of incidence like that at recording, a recovered beam diffracted from the holograms is detected using an image sensor, and thereby, the information recorded in the optical information recording medium is reproduced.

At recording/reproduction of the holograms, when the optical information recording medium is exposed to light that does not contribute to recording/reproduction (hereinafter, referred to as "stray light"), production of unnecessary exposed regions and formation/reproduction of unintended holograms are caused. By the production of unnecessary exposed regions, M# (M-number) as an index indicating the multiplexing recording performance of the optical information recording medium is wasted, and problems arise in high-capacity high-density recording. Further, by the formation/reproduction of unintended holograms, the diffracted beam and the recovered beam from the holograms interfere on the image sensor and cause deterioration in quality of reproduced signals. As described above, when stray light is generated at holographic recording/reproduction, stable signal reproduction becomes harder.

In example 6 of Patent Document 1, for optimization of the luminous flux diameter of the reference beam, the wedge prism having the reflection film rotationally controlled by the galvano motor and having the tilted optical surface is used. In this case, a surface-reflected beam of the wedge prism becomes stray light, however, Patent Document 1 does not disclose the problem.

Further, in Patent Document 2, the diffraction grating is used for optimization of the luminous flux diameter of the reference beam, and actually, not only a desired diffracted beam of the diffraction grating but also a zero-order beam and a high-order diffracted beam appear and the beams become stray light. However, Patent Document 2 does not disclose the problem.

SUMMARY OF THE INVENTION

An object of the invention is to reduce an influence of stray light and stably record/reproduce high-quality data in holographic recording/reproduction.

In order to solve the problems, for example, configurations described in Claims are employed. This application includes a plurality of means for solving the problems. One example includes an optical system that generates a reference beam, an optical element that guides the reference beam generated in the optical system to an optical information recording medium at a desired angle of incidence, a control part that controls the optical element and controls the angle of incidence of the reference beam generated in the optical system to the optical information recording medium, and a lens part that images the reference beam controlled in the control part in a desired position of the optical information recording medium, wherein at least a first light beam at a first angle and a second light beam at a second angle different from the first angle are output from the optical element, and the optical element is provided so that the first light beam may propagate within an effective diameter of the lens part and the second light beam may propagate to an outside of the effective diameter of the lens part.

According to the invention, in holographic recording/reproduction, an influence of stray light may be reduced and stable recording/reproduction may be performed.

The other problems, configurations, and advantages than those described above will be made clear by the following description of the embodiments.

DETAILED DESCRIPTION OF THE EMBODIMENTS

As below, examples will be explained using the drawings.

Example 1

Figure 1:
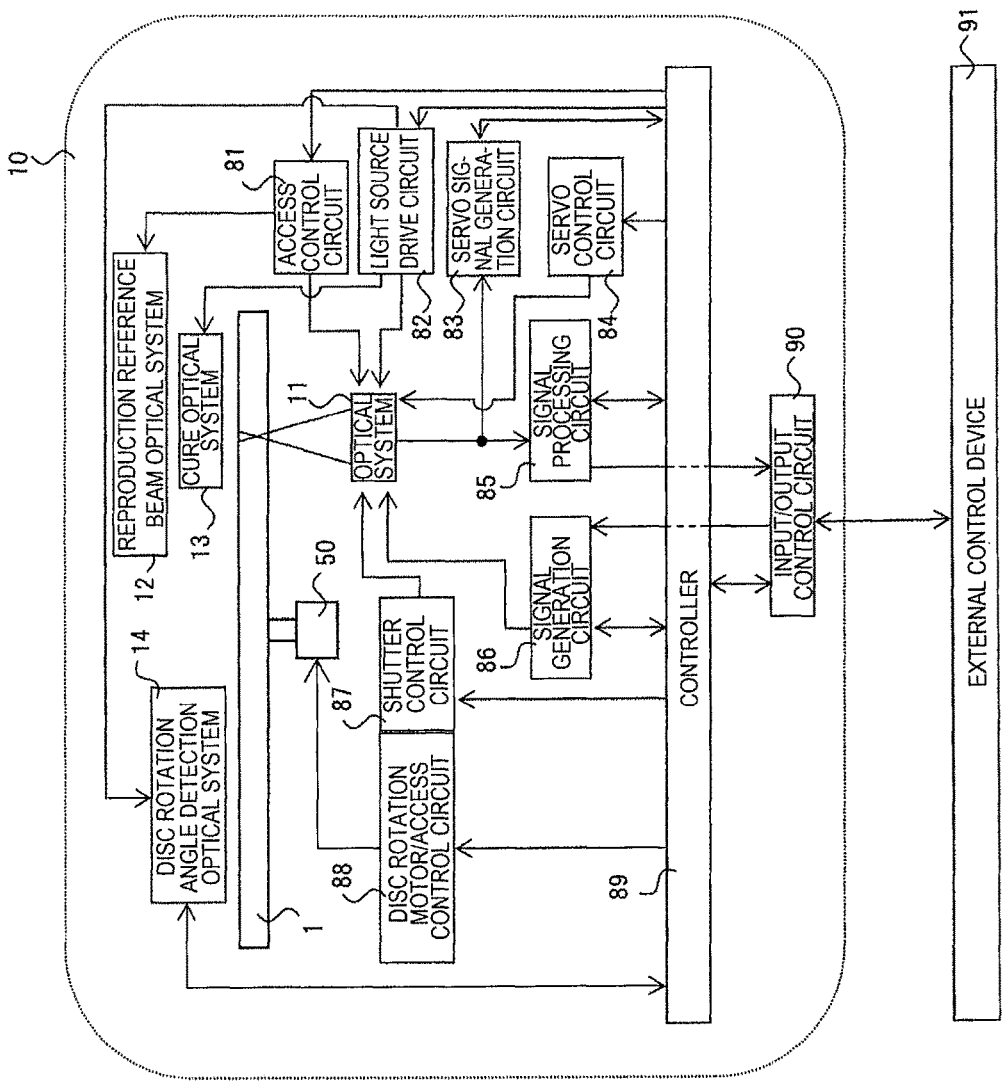
FIG. 1 is a block diagram showing a holographic memory device in example 1.

First, an embodiment of the invention is explained according to the drawings. FIG. 1 is a block diagram showing a configuration of a holographic memory device 10 that records/reproduces digital information in optical information recording media as holograms.

The holographic memory device 10 is connected to an external control device 91 via an input/output control circuit 90. When recording, the holographic memory device 10 receives information signals to record from the external control device 91 by the input/output control circuit 90. When reproducing, the holographic memory device 10 transmits reproduced information signals to the external control device 91 by the input/output control circuit 90.

The holographic memory device 10 includes an optical system 11, a reproduction reference beam optical system 12, a cure optical system 13, a disc rotation angle detection optical system 14, and a rotation motor 50, and an optical information recording medium 1 is adapted to be rotatable by the rotation motor 50.

The optical system 11 serves to expose the optical information recording medium 1 to a reference beam and a signal beam and record digital information in the recording medium as a hologram. In this regard, the information signals to be recorded are sent into a spatial light modulator, which will be described later, within the optical system 11 via a signal generation circuit 86 by a controller 89, and the signal beam is modulated by the spatial light modulator.

When the information recorded in the optical information recording medium 1 is reproduced, the reference beam output from the optical system 11 is converted by the reproduction reference beam optical system 12 connected to an access control circuit 81 to enter the optical information recording medium 1 in the opposite direction to that when recorded. The recovered beam reproduced by the reproduction reference beam is detected by a photodetector, which will be described later, within the optical system 11 and the signals are reproduced by a signal processing circuit 85.

The exposure time of the optical information recording medium 1 exposed to the reference beam and the signal beam may be adjusted by control of the open and close times of a shutter within the optical system 11 by the controller 89 via a shutter control circuit 87.

The cure optical system 13 serves to generate beams used for pre-cure and post-cure of the optical information recording medium 1. The pre-cure refers to a pre-process, when information is recorded in a desired position within the optical information recording medium 1, of exposure to a predetermined beam in advance before exposure of the desired position to the reference beam and the signal beam. The post-cure refers to a post-process, after information is recorded in a desired position within the optical information recording medium 1, of exposure of the desired position to a predetermined beam for disabling additional writing.

The disc rotation angle detection optical system 14 is used for detection of the rotation angle of the optical information recording medium 1. When the optical information recording medium 1 is set at a predetermined rotation angle, signals in response to the rotation angles are detected by the disc rotation angle detection optical system 14 and the rotation angle of the optical information recording medium 1 may be controlled by the controller 89 using the detected signals via a disc rotation motor control/access control circuit 88.

From a light source drive circuit 82, predetermined light source drive currents are supplied to light sources within the optical system 11, the cure optical system 13, and disc rotation angle detection optical system 14, and light beams may be emitted from the respective light sources in predetermined amounts of light.

Further, the rotation motor 50 is provided with a mechanism that can slide its position in a radial direction of the optical information recording medium 1, and position control is performed via the disc rotation motor/access control circuit 88.

Now, the recording technology using the principle of angular multiplexing of holograms has a tendency that the acceptable error with respect to the shift of the reference beam angle is extremely smaller.

Therefore, it is necessary to provide a mechanism of detecting the amount of shift of the reference beam angle within the optical system 11, and provide a servo mechanism for generating signals for servo control in a servo signal generation circuit 83 and correcting the amount of shift via a servo control circuit 84 within the holographic memory device 10.

Further, the optical system 11, the cure optical system 13, and the disc rotation angle detection optical system 14 may be simplified by integration of some optical system configurations or all optical system configurations.

Figure 2:
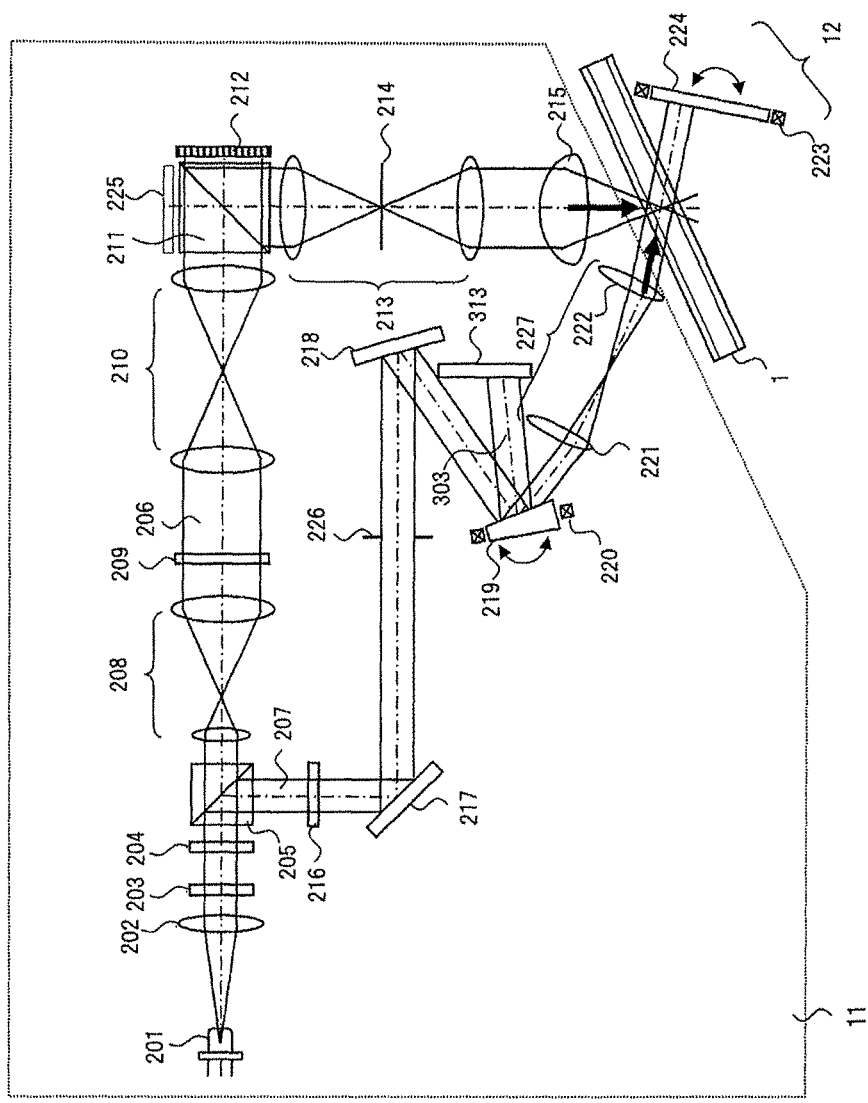
FIG. 2 is a schematic diagram showing an optical system within the holographic memory device in example 1.

FIG. 2 shows a recording principle in one example of a basic optical system configuration of the optical system 11 in the holographic memory device 10. The light beam output from a light source 201 is transmitted through a collimator lens 202, and enters a shutter 203. When the shutter 203 is open, the light beam passes through the shutter 203, its polarization direction is controlled so that the ratio between amounts of light of p-polarized light and s-polarized light may be a desired ratio by a polarization direction conversion element 204 including e.g. a half-wave plate, and then, the beam enters a polarization beam splitter 205.

The light beam transmitted through the polarization beam splitter 205 serves as a signal beam 206, its light beam diameter is expanded by a beam expander 208, and then, the beam is transmitted through a phase mask 209, a relay lens 210, and a polarization beam splitter 211 and enters a spatial light modulator 212. The spatial light modulator 212 is a device that spatially modulates light intensity, and two-dimensional digital information is added to the signal beam using the modulator.

The signal beam to which information has been added by the spatial light modulator 212 is reflected by the polarization beam splitter 211 and propagates in a relay lens 213 and a spatial filter 214. Then, the signal beam is focused on the optical information recording medium 1 by an objective lens 215.

On the other hand, the light beam reflected by the polarization beam splitter 205 serves as a reference beam 207, set in a predetermined polarization direction in response to recording or reproduction by a polarization direction conversion element 216, and then, enters a wedge prism 219 via a mirror 217, an iris 226 that shapes the reference beam, and a mirror 218. The angle of the wedge prism 219 can be set by an actuator 220, and thereby, the angle of incidence of the reference beam passed through a scanner lens 227 including a lens 221 and a lens 222 and entering the optical information recording medium 1 may be set at a desired angle.

Figure 4B:
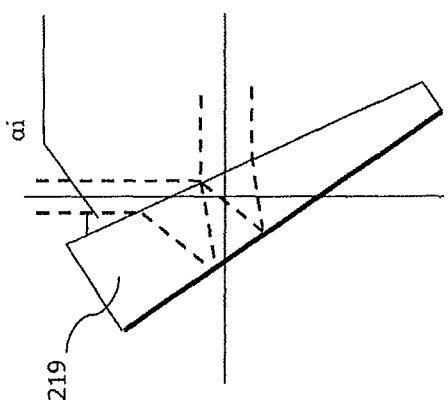
FIGS. 4A and 4B show a basic principle of a wedge prism.
Figure 4A:
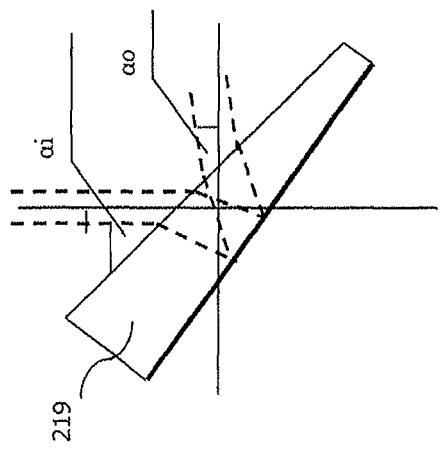

Further, the wedge prism 219 may change the output luminous flux diameter in response to the angle of incidence of the beam as described in example 6 of Patent Document 1, for example, using internal reflection. FIGS. 4A and 4B show a basic principle of the wedge prism. In the wedge prism 219, the thickness of the lens changes in response to an angle of incidence αi and a position of incidence, and thus, an output angle αo and a beam diameter of output light are different between when the angle of incidence αi of the reference beam shown by a broken line to the wedge prism 219 is smaller (FIG. 4A) and when the angle is larger (FIG. 4B). Furthermore, when the wave front of the incident light of the wedge prism 219 is uniform and the power density within the luminous flux is uniform, the wave front of the output light of the wedge prism 219 is also uniform and the power density is uniform. The beam diameter of the reference beam is changed in response to the angle of incidence of the reference beam to the optical information recording medium using the wedge prism 219, and thereby, light use efficiency can be improved.

Note that a surface-reflected beam 303 of the wedge prism 219 is generated, and the beam is absorbed by a light absorbing filter 313 for elimination of the influence on recording/reproduction.

The signal beam and the reference beam are allowed to enter to overlap with each other within the optical information recording medium 1, and thereby, an interference pattern is formed within the recording medium and information is recorded by writing of the pattern in the recording medium. Further, the angle of incidence of the reference beam entering the optical information recording medium 1 may be changed by the wedge prism 219, and thus, recording by angular multiplexing can be performed.

Hereinafter, of holograms recorded in the same region at different reference beam angles, a hologram corresponding to each reference beam angle is referred to as "page" and a collection of the pages angular-multiplexed in the same region is referred to as "book".

Figure 3:
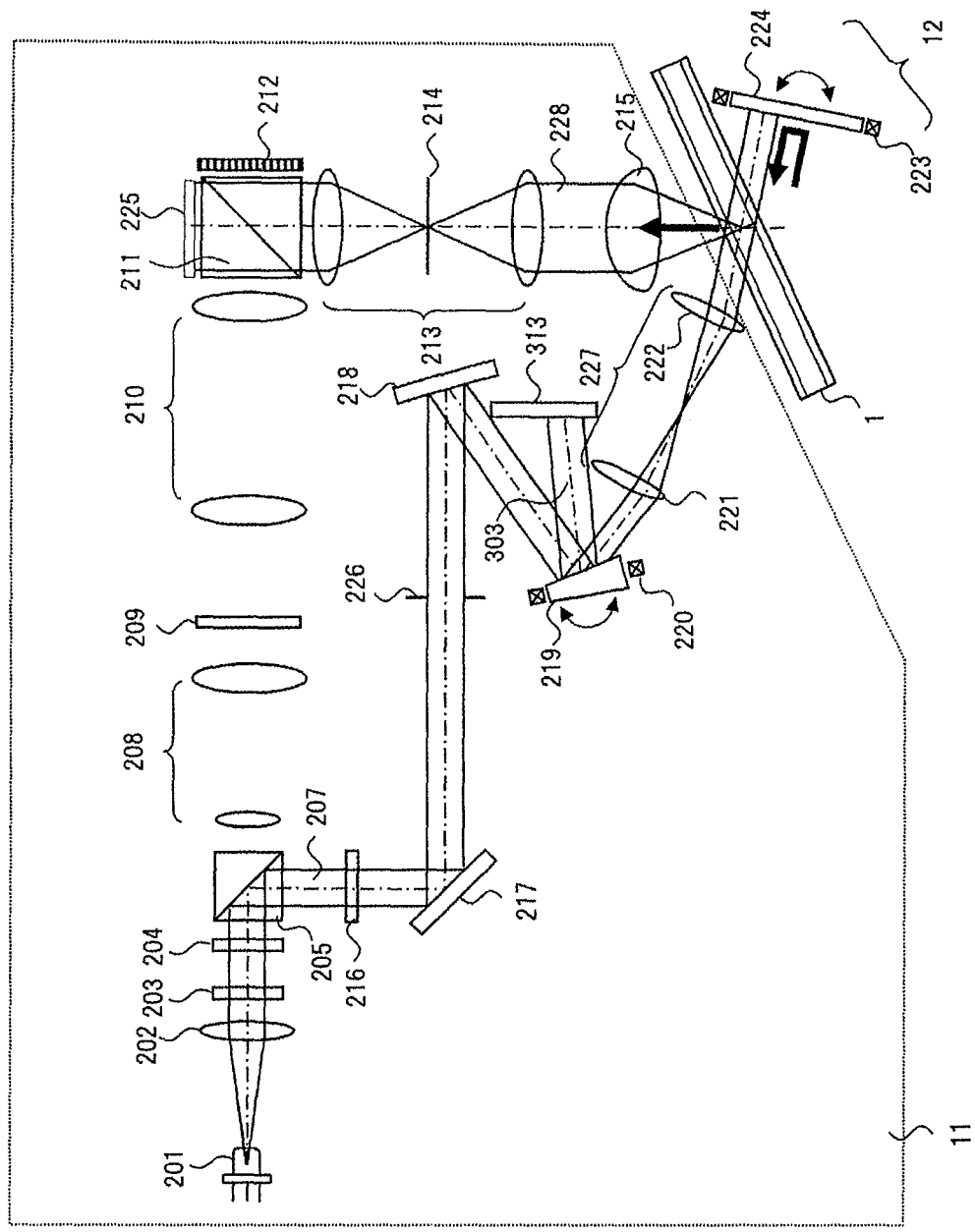
FIG. 3 is a schematic diagram showing the optical system within the holographic memory device in example 1.

FIG. 3 shows a reproduction principle in one example of the basic optical system configuration of the optical system 11 in the holographic memory device 10. When the recorded information is reproduced, only the reference beam 207 is produced using the polarization direction conversion element 204, and further, the polarization direction is rotated to 90 degrees with respect to that at recording using the polarization direction conversion element 216. The reference beam enters the wedge prism 219 via the mirror 217, the iris 216, and the mirror 218, is set at a desired reference beam angle, and then, enters the optical information recording medium 1. The light beam transmitted through the optical information recording medium 1 is reflected by a galvano mirror 224 at an angle that can be set, and its reproduction reference beam is generated. The recovered beam diffracted by the reproduction reference beam propagates the objective lens 215, the relay lens 213, and the spatial filter 214. Then, the recovered beam is transmitted through the polarization beam splitter 211 and enters a photodetector 225, and may reproduce the recorded signals.

As the photodetector 225, an image sensor e.g. a CMOS image sensor or CCD image sensor may be used, and any device may be used as long as it can reproduce page data.

As below, characteristics of the example will be described in detail. The example is characterized in that the luminous flux diameter of the reference beam 207 is corrected and the surface-reflected beam 303 of the wedge prism 219 is propagated to the outside of a scanner lens effective diameter 304.

FIGS. 5 and 6A to 6C show states of propagation of beams with respect to the wedge prism 219. Here, the beam shows a center of luminous flux. When the reference beam 207 enters the wedge prism 219 at an angle of incidence θin, the reference beam 207 is refracted and internally reflected by the wedge prism 219, and propagates into the scanner lens effective diameter 304.

Figure 5:
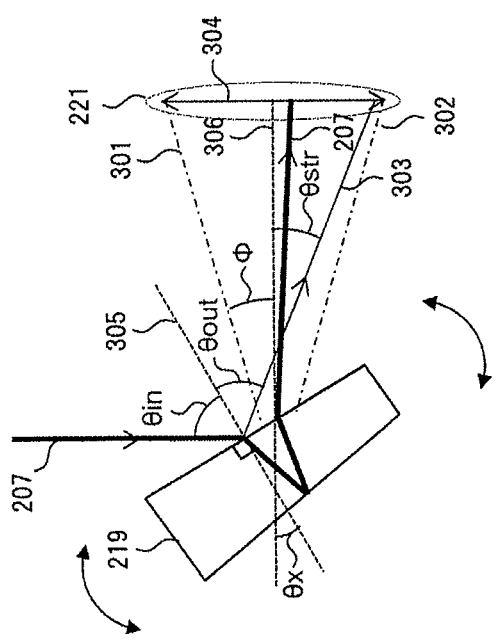
FIG. 5 is a schematic diagram showing a configuration of a wedge prism in Patent Document 1.

Here, the scanner lens effective diameter 304 may be determined according to the numerical aperture of the lens and the flange back. The angle of the wedge prism 219 is changed, and thereby, as described in example 6 of Patent Document 1, the angle and the luminous flux diameter of the reference beam may be changed. Here, the surface-reflected beam 303 of the wedge prism 219 is reflected at a reflection angle θout=θin according to the law of reflection. When propagating into the scanner lens effective diameter 304 as shown in FIG. 5, the surface-reflected beam 303 becomes stray light and has the above described influence on holographic recording/reproduction.

Here, θstr is an angle formed by the surface-reflected beam 303 and a center axis 306 of the lens 221 forming a part of the scanner lens 227, and φ is an angle formed by the center axis 306 of the lens 221 and a beam 301 or 302 passing through the lens end surface of the lens 221. The angular multiplexing recording is performed by scanning of the reference beam angle of incidence, and the scan range of the reference beam angle of incidence is an angle ±φ(φ>0) with respect to the center axis 306 of the lens 221.

The surface-reflected beam 303 can be reduced by a technology called Anti-reflection coating (AR coating) or Anti-reflection structure (ARS), however, it is difficult to completely eliminate the reflected beam and the price of the element becomes higher. This problem is not described in Patent Document 1.

Figure 6A:
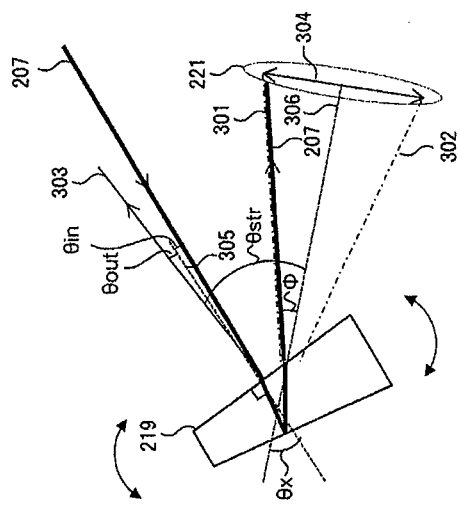
FIGS. 6A to 6C are schematic diagrams showing a configuration of a wedge prism in example 1.
Figure 6C:
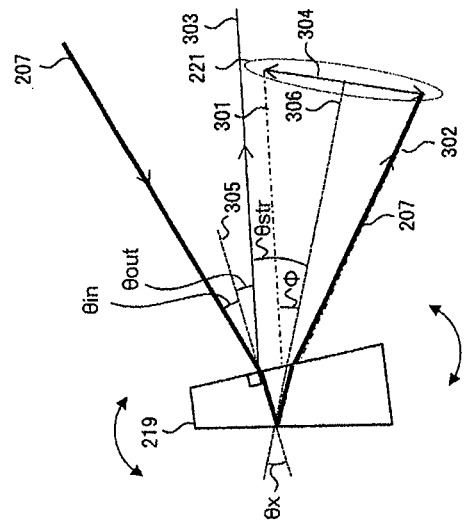
Figure 6B:
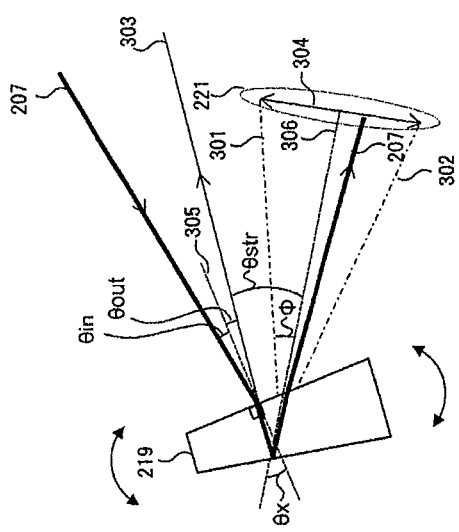

To solve the problem, a configuration in FIGS. 6A to 6C is employed in the example. FIGS. 6A to 6C respectively show the cases where the reference beam angle of incidence is an angle +φ (FIG. 6A), an angle between +φ and −φ (FIG. 6B), and angle −φ (FIG. 6C) with respect to the center axis 306 of the lens 221 and the surface-reflected beam 303 propagates to the outside of the scanner lens effective diameter 304.

As described above, within the reference beam angle scan range (in FIGS. 6A to 6C, as an example, within the range in which the reflection angle of the reference beam 207 is from the angle +φ to the angle −φ with respect to the center axis 306 of the lens 221), the following condition is satisfied.

$$\theta_{str} > \phi \qquad \text{(Expression 1)}$$

That is, an arrangement configuration including the shape of the wedge prism and the reference beam angle scan range such that the surface-reflected beam 303 may propagate to the outside of the scanner lens effective diameter 304 is employed.

Thereby, the surface-reflected beam 303 of the wedge prism 219 may propagate to the outside of the scanner lens effective diameter 304 in the reference beam angle scan range and correct the luminous flux diameter of the reference beam on the medium.

Further, regarding the surface-reflected beam 303 as stray light, the configuration in which the beam propagates toward the incident light 207 side with respect to the center axis 306 of the lens 221 as shown in FIGS. 6A to 6C and the configuration in which the beam propagates toward the opposite side to the incident light 207 with respect to the center axis 306 of the lens 221 as shown in FIG. 5 are conceivable, and the configuration of propagating toward the incident light 207 side is employed in the example. That is, the following relationship is satisfied.

$$\theta x - \theta out > \phi \qquad \text{(Expression 2)}$$

Here, $\theta x$ is an angle formed by a normal 305 of the wedge prism face of incidence and the center axis 306 of the lens 221.

Thereby, the wedge prism 219 can be downsized and advantageous for high-speed drive control using the actuator 220.

Further, (Expression 2) can be expressed by the following expression according to the law of reflection $\theta in = \theta out$.

$$\theta x - \theta in > \phi \qquad \text{(Expression 3)}$$

In the example, only the reference beam 207 propagates within the scanner lens 227 at reproduction, however, for control signal detection, two or more luminous fluxes may be propagated within the scanner lens 227. On the other hand, it is desirable that only the reference beam 207 propagates within the scanner lens 227 at recording. Further, in the example, (Expression 1) is satisfied for all angles within the reference beam angle scan range, however, the invention is effective if (Expression 1) is satisfied for part of angles within the reference beam angle scan range. The same applies to the following examples.

According to the example, the luminous flux diameter of the reference beam 207 is corrected and the surface-reflected beam 303 of the wedge prism 219 is propagated to the outside of the scanner lens effective diameter 304, and thereby, the problem that the surface-reflected beam 303 of the wedge prism 219 affects holographic recording/reproduction as stray light is reduced and stable recording/reproduction may be performed.

Example 2

Figure 7:
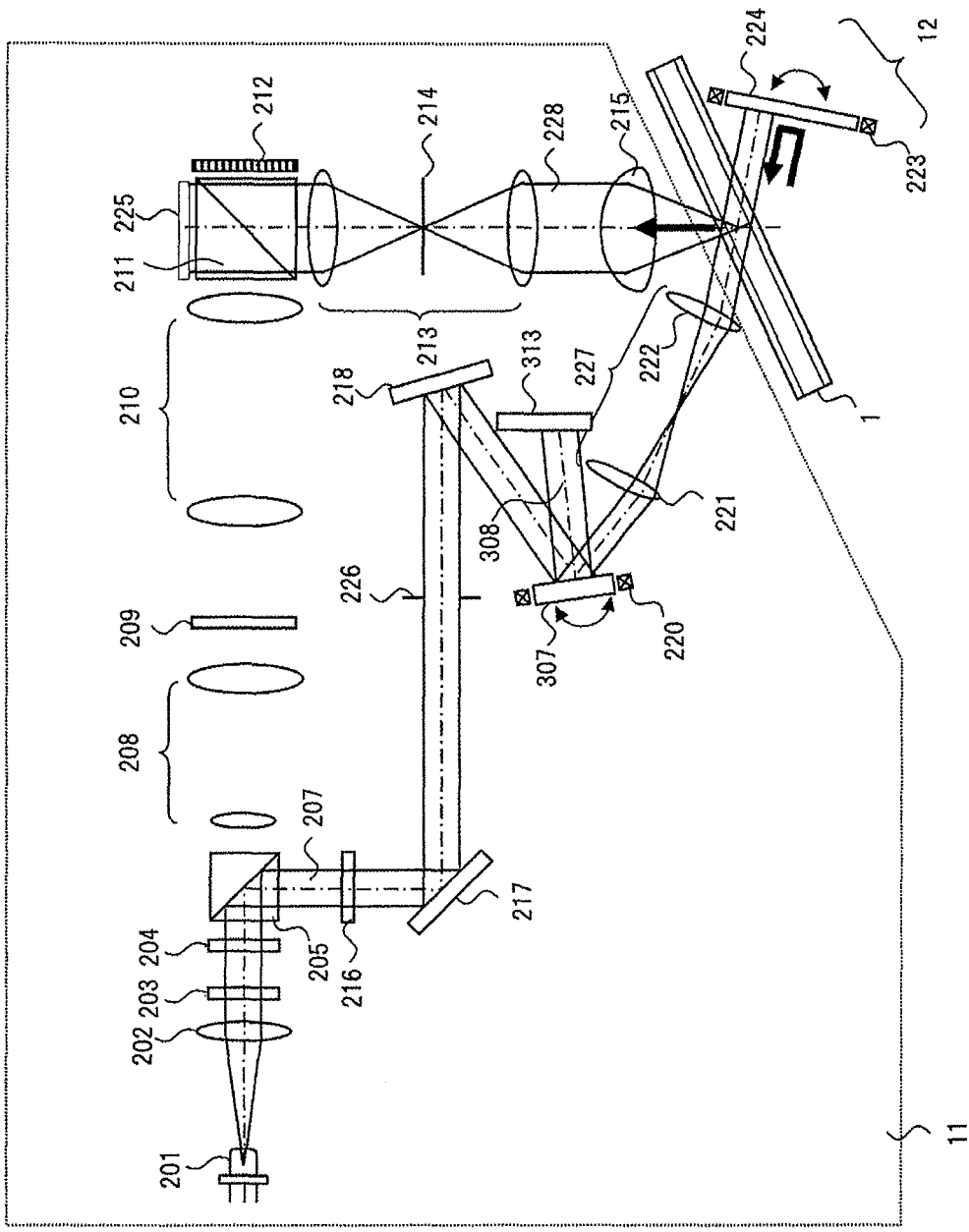
FIG. 7 is a schematic diagram showing an optical system within a holographic memory device in example 2.

FIG. 7 shows an optical system of the holographic memory device 10 of the double-luminous flux angular multiplexing system according to the second example of the invention. In the example, in comparison to example 1, the recording/reproduction method and the notions about the optical element in the angular multiplexing system are the same, and the example is characterized in that a reflection-type volume holographic optical element 307 is provided in place of the wedge prism 219. By application of the example, the influence of stray light may be avoided and the luminous flux diameter may be corrected as is the case with example 1. Further, in comparison to example 1, aberration of the optical system and the intensity profile of the reference beam may be corrected.

Figure 8B:
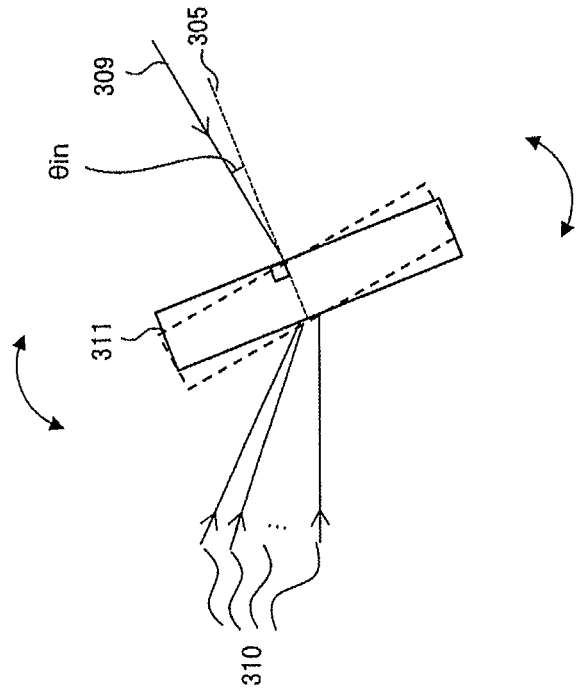
FIGS. 8A and 8B are schematic diagrams showing a configuration of a volume holographic optical element in example 2.
Figure 8A:
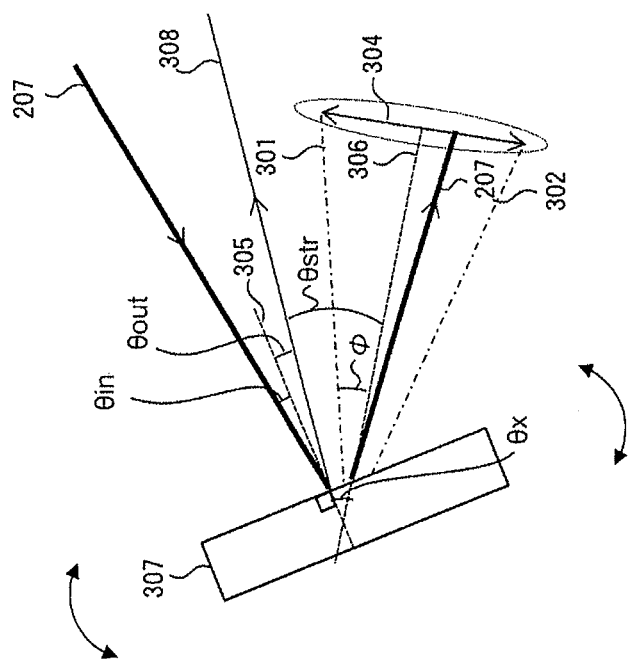

FIGS. 8A and 8B show states of propagation of beams with respect to the reflection-type volume holographic optical element 307. As shown in FIG. 8A, when the reference beam 207 enters the volume holographic optical element 307 at an angle of incidence $\theta in$, only diffracted beam at an angle that satisfies the law of Bragg as a characteristic of the volume holographic optical element is output. In the example, the volume holographic optical element 307 is formed in advance so that the diffracted beam may have desired luminous flux diameter and angle. Here, a surface-reflected beam 308 of the volume holographic optical element 307 is reflected at a reflection angle $\theta out = \theta in$ according to the law of reflection. The surface-reflected beam 308 becomes stray light when propagating within the scanner lens effective diameter 304 and has the above described influence on holographic recording/reproduction.

Accordingly, in order to solve the problem, in the example, the volume holographic optical element 307 is formed to satisfy the expression 1 within the reference beam angle scan range. Thereby, recording/reproduction may be performed while avoiding the surface-reflected beam 308 of the volume holographic optical element 307.

FIG. 8B shows an example of a method of forming the volume holographic optical element 307. For its material, a thick silver halide photosensitive material or a hologram photosensitive material including photo polymer is used. Both sides of the photosensitive material 311 are exposed to a beam from the same light source, and thereby, reflection-type holograms are formed. In this regard, angular multiplexing recording of holograms are sequentially performed using a beam 309 as reference and a beam 310 having desired angle and luminous flux diameter while the angle of the photosensitive material 311 is changed. As described above, the volume holographic optical element 307 realizing output light having the desired angle and luminous flux diameter in response to the angle of incidence may be realized. Aberration generated in the upstream optical system is provided to the beam 309 and aberration for correction of aberration generated due to the scanner lens 227 in response to the angle is provided to the beam 310, and thereby, the beam may serve as an aberration correction element. Further, a desired intensity distribution is provided to the beam 310, and thereby, the beam may serve to correct the reference light intensity profile.

According to the example, the luminous flux diameter of the reference beam 207 may be corrected and the surface-reflected beam 308 of the reflection-type volume holographic optical element 307 may be propagated to the outside of the scanner lens effective diameter 304, and thereby, the problem that the surface-reflected beam 308 of the volume holographic optical element 307 affects holographic recording/reproduction as stray light may be reduced and stable recording/reproduction may be performed. Further, in comparison to example 1, the aberration of the optical system and the intensity profile of the reference beam may be corrected.

Example 3

Figure 9:
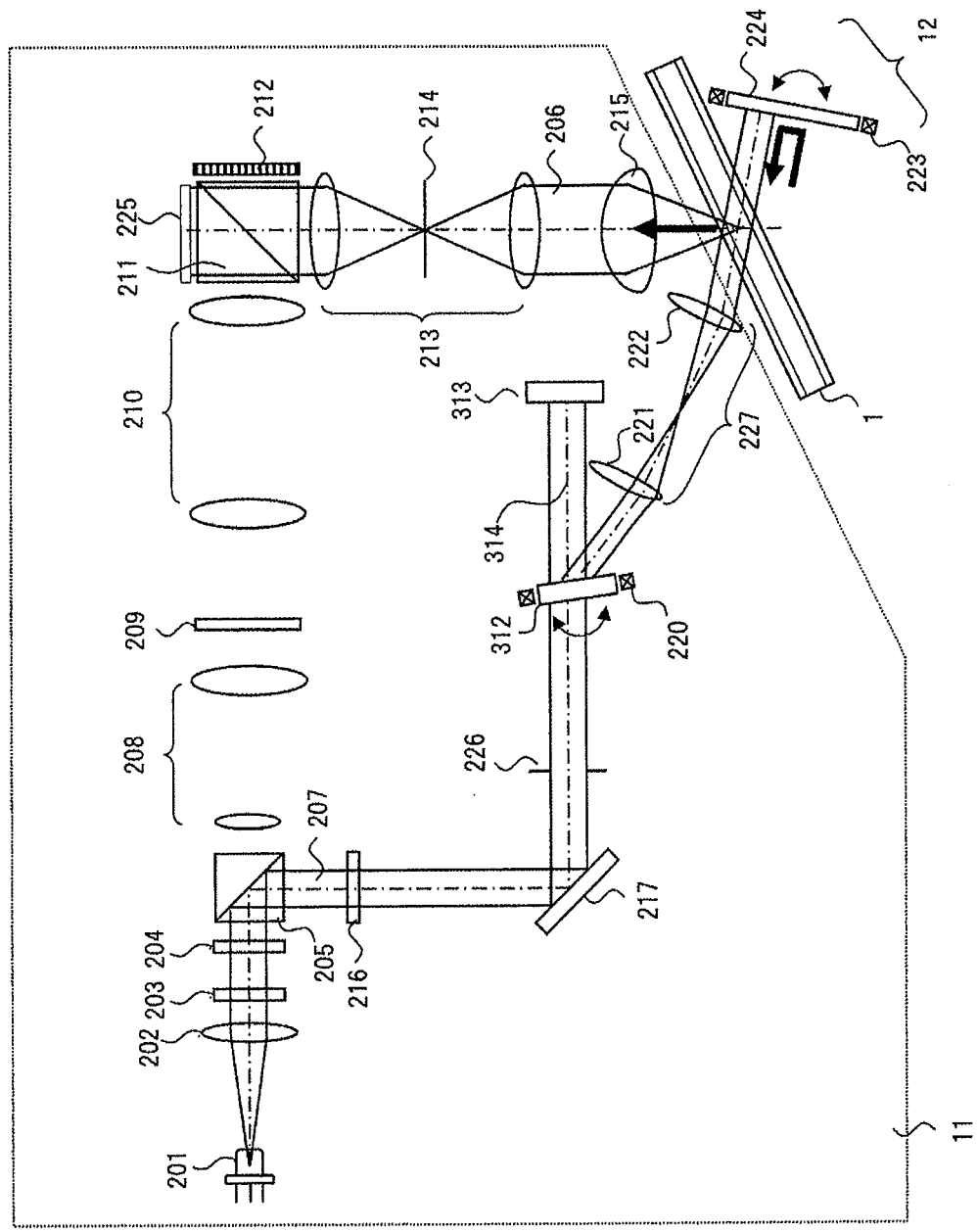
FIG. 9 is a schematic diagram showing an optical system within a holographic memory device in example 3.

FIG. 9 shows an optical system of the holographic memory device 10 of the double-luminous flux angular multiplexing system according to the third example of the invention. In the example, in comparison to example 2, the recording/reproduction method and the notions about the optical element in the angular multiplexing system are the same, and the example is characterized in that a transmission-type volume holographic optical element 312 is provided. By application of the example, the aberration of the optical system and the intensity profile of the reference beam may be corrected as is the case with example 2.

Figure 10:
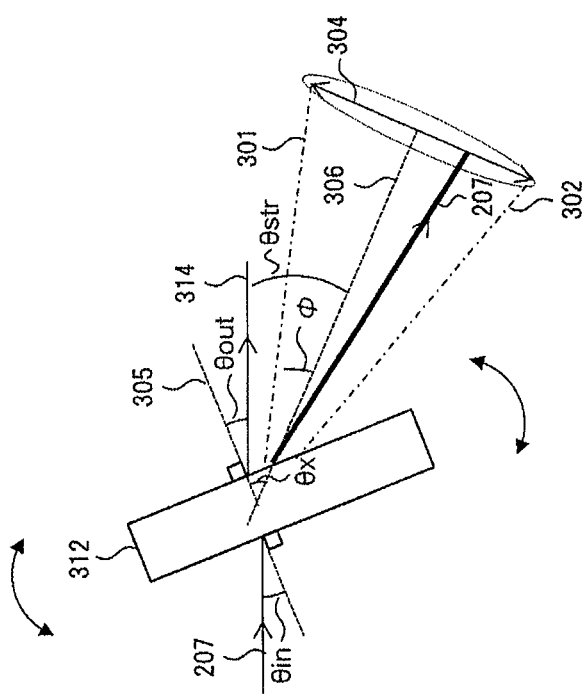
FIG. 10 is a schematic diagram showing a configuration of a volume holographic optical element in example 3.

FIG. 10 shows a state of propagation of a beam with respect to the transmission-type volume holographic optical element 312. When the reference beam 207 enters the volume holographic optical element 312 at an angle of incidence θin, only a diffracted beam at an angle that satisfies the law of Bragg as a characteristic of the volume holographic optical element is output. In the example, the volume holographic optical element 312 is formed so that the diffracted beam may have desirable luminous flux diameter and angle. Here, zero-order light 314 of the volume holographic optical element 312 is transmitted at an output angle θout=θin. The zero-order light 314 becomes stray light when propagating within the scanner lens effective diameter 304 and has the above described influence on holographic recording/reproduction.

Accordingly, in order to solve the problem, in the example, the volume holographic optical element 312 is formed to satisfy the expression 1 within the reference beam angle scan range. Thereby, recording/reproduction may be performed while avoiding the zero-order light 314 of the volume holographic optical element 312.

The method of forming the transmission-type volume holographic optical element 312 is realized using the same notions as those of the method described in example 2. Here, because of the transmission type, it is necessary to allow the beam 309 and the beam 310 in FIG. 8B to enter the photosensitive material 311 from the same direction.

According to the example, the luminous flux diameter of the reference beam 207 may be corrected and the zero-order light 314 of the transmission-type volume holographic optical element 312 may be propagated to the outside of the scanner lens effective diameter 304, and thereby, the problem that the zero-order light 314 of the volume holographic optical element 312 affects holographic recording/reproduction as stray light may be reduced and stable recording/reproduction may be performed. Further, in comparison to example 1, the aberration of the optical system and the intensity profile of the reference beam may be corrected.

Example 4

Figure 11:
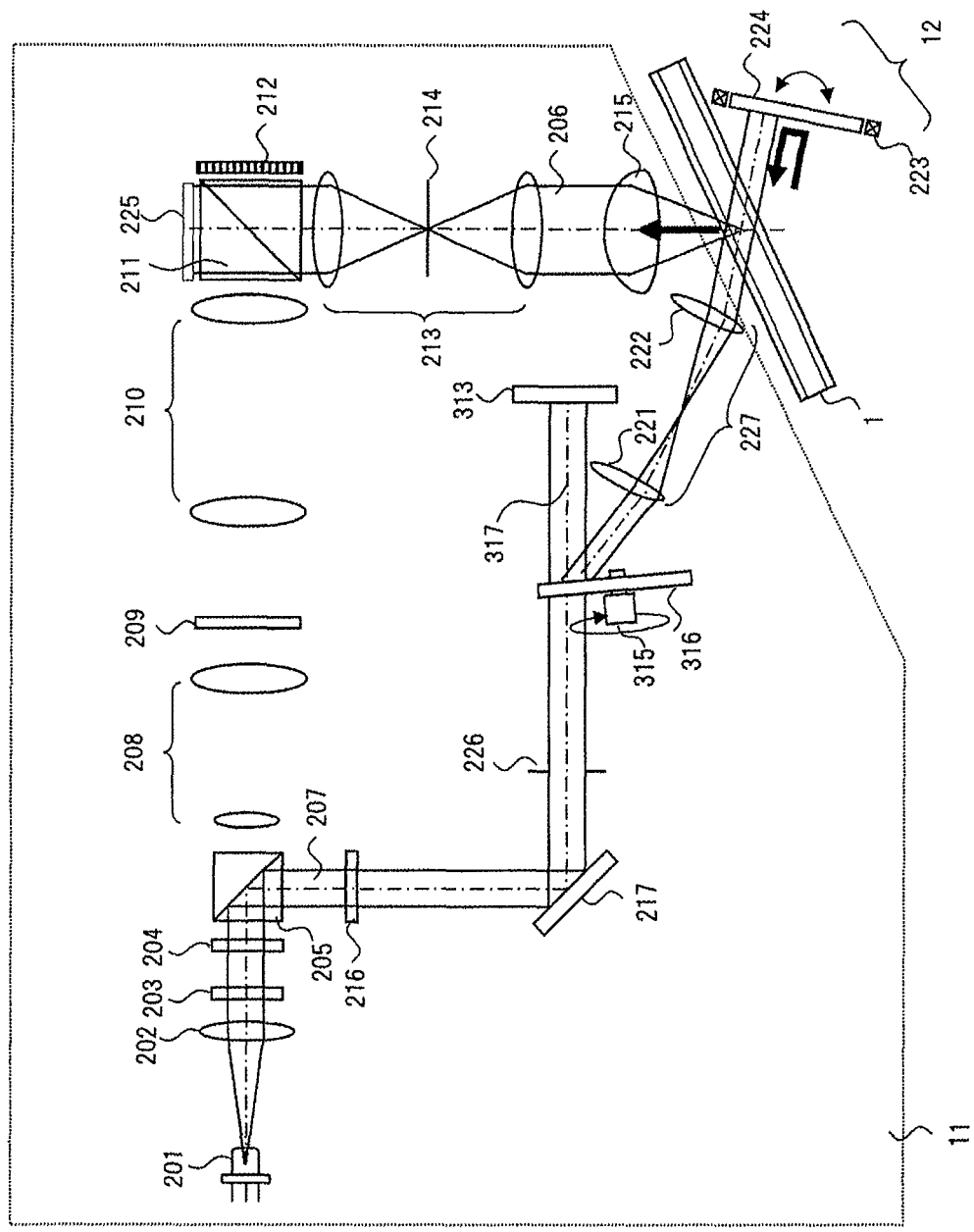
FIG. 11 is a schematic diagram showing an optical system within a holographic memory device in example 4.

FIG. 11 shows an optical system of the holographic memory device 10 of the double-luminous flux angular multiplexing system according to the fourth example of the invention. In the example, in comparison to example 1, the recording/reproduction method and the notions about the optical element in the angular multiplexing system are the same, and the example is characterized in that a rotation motor 315 and a diffraction grating 316 are provided in place of the wedge prism 219 and the actuator 220. By application of the example, the influence of stray light may be avoided and the luminous flux diameter may be corrected as is the case with example 1.

The details of the configuration are described in Patent Document 2. The diffraction grating 316 rotates according to the rotation of the rotation motor 315 in an in-plane direction. In the diffraction grating 316, the diffraction grating space continuously changes according to the rotation and, as a result, the output angle of the beam is continuously changed. Further, the diffraction grating 316 is placed to have an imaging relationship with the optical information recording medium 1 via the scanner lens 227. Thereby, the luminous flux diameter on the optical information recording medium 1 is fixed and suppression of unnecessary exposed regions and improvement in light use efficiency are realized.

Figure 12:
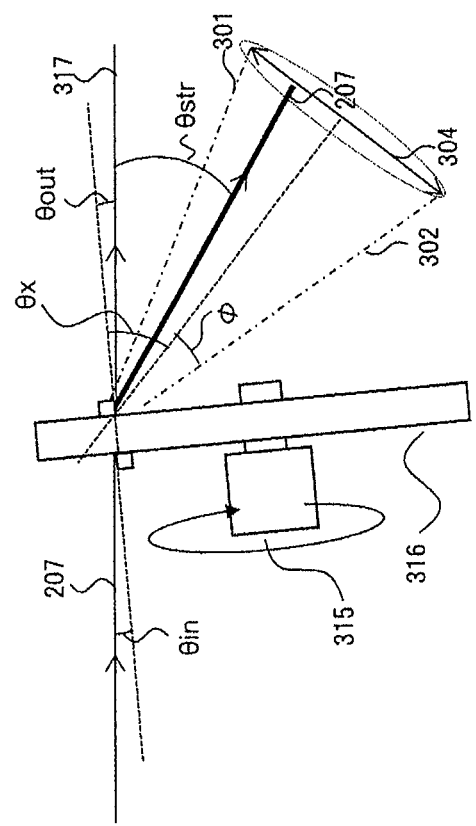
FIG. 12 is a schematic diagram showing a configuration of a diffraction grating in example 4.

FIG. 12 shows a state of propagation of a beam with respect to the diffraction grating 316. When the reference beam 207 enters the diffraction grating at an angle of incidence θin, the beam is diffracted by the diffraction grating and output at an angle determined depending on the shape and the pitch of the diffraction grating.

In the example, a condition for stray light generated due to manufacturing accuracy of the diffraction grating, e.g. zero-order light 317 not to enter the scanner lens effective diameter 304, i.e., the condition of (expression 1) is satisfied. Thereby, recording/reproduction may be performed while avoiding the zero-order light 317 of the diffraction grating 316.

The diffraction grating may be of a reflection-type, or a transmission-type volume diffraction grating or reflection-type volume diffraction grating. In the case of the volume diffraction grating, the aberration correction of the optical system and the intensity profile correction of the reference beam may be performed according to the same notions as those of the method of forming the volume holographic optical element described in example 2.

Note that, in the example, it is assumed that the stray light is a surface-reflected beam/zero-order light of the volume holographic optical element/diffraction grating, however, the notions may be the same about a high-order diffracted beam.

According to the example, the luminous flux diameter of the reference beam 207 may be corrected and the zero-order light 317 of the diffraction grating 316 may be propagated to the outside of the scanner lens effective diameter 304, and thereby, the problem that the zero-order light 317 of the diffraction grating 316 affects holographic recording/reproduction as stray light may be reduced and stable recording/reproduction may be performed.

Example 5

Figure 13:
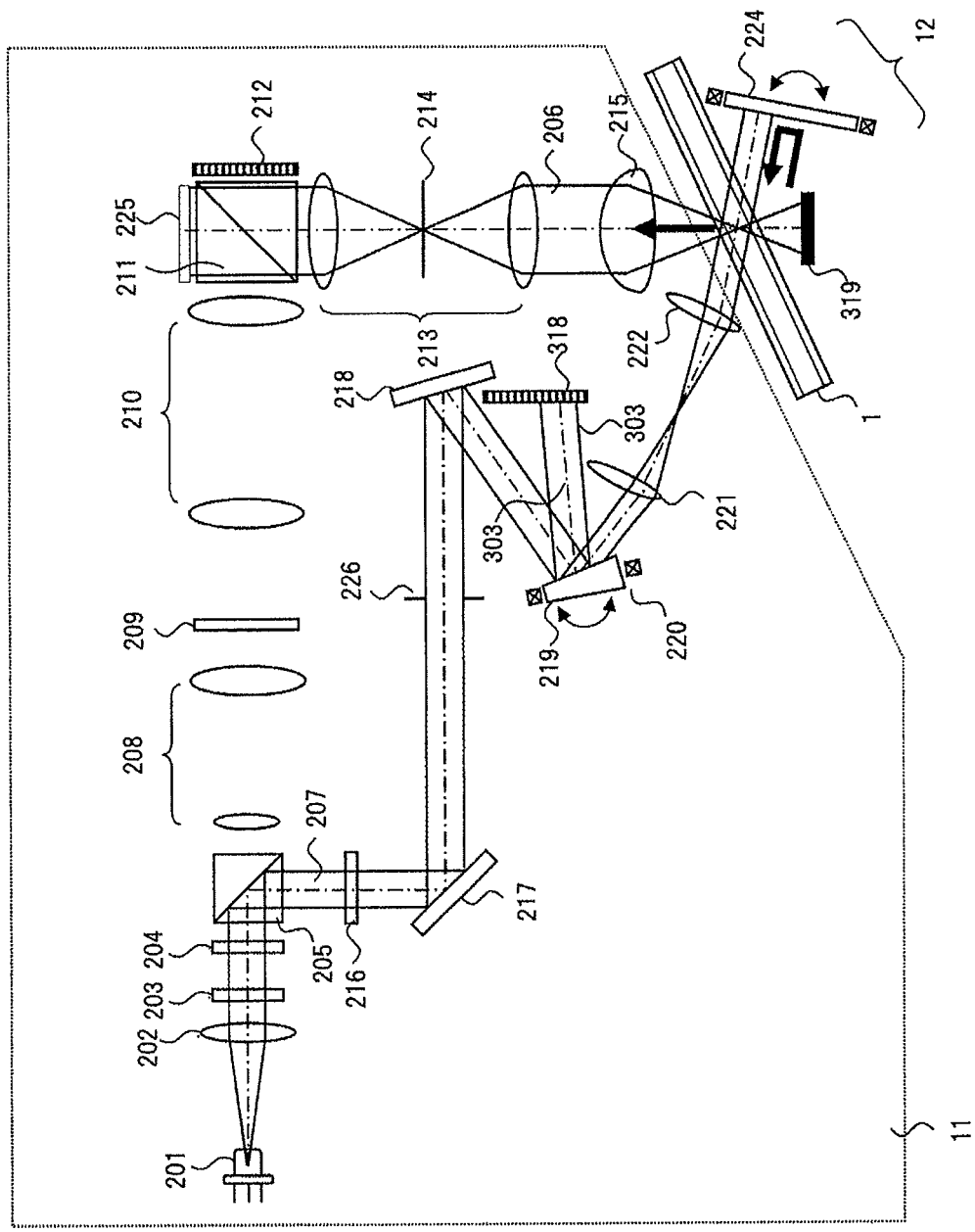
FIG. 13 is a schematic diagram showing an optical system within a holographic memory device in example 5.

FIG. 13 shows an optical system of the holographic memory device 10 of the double-luminous flux angular multiplexing system according to the fifth example of the invention. In the example, in comparison to example 1, the recording/reproduction method and the notions about the optical element in the angular multiplexing system are the same, and the example is characterized in that the surface-reflected beam 303 of the wedge prism 219 is acquired using a photodetector 318. By application of the example, the influence of stray light may be avoided and the luminous flux diameter may be corrected as is the case with example 1, and further, optical characteristics of the reference beam may be fed back to recording/reproduction operation and stable recording/reproduction may be performed.

Using the photodetector 318, e.g. the intensity of the reference beam may be measured. In the holographic recording, information of intensity is important. The exposure intensity to the recording medium is estimated from the detected reference light intensity, and thereby, displacement of the optical components due to changes over time and the ratio of amounts of light between the signal beam and the reference beam may be adjusted. Further, a PSD (Position Sensitive Detector) is used for the photodetector 318, and thereby, the angle of the reference beam can be detected and the disc angle of incidence of the reference beam may be finely adjusted using the information. Furthermore, in place of the photodetector 318, a Shack-Hartmann wavefront sensor is provided to detect aberration of the reference beam, a CCD image sensor is provided to detect the reference light intensity distribution or detect coherence of the reference beam or the like by allowing the reference beam 207 to be transmitted through a half mirror and reflected by a wedge-shaped disc, further reflected by the half mirror, and entering the CCD image sensor, and thereby, whether or not the optimal recording/reproduction condition is obtained may be confirmed one by one.

Figure 14:
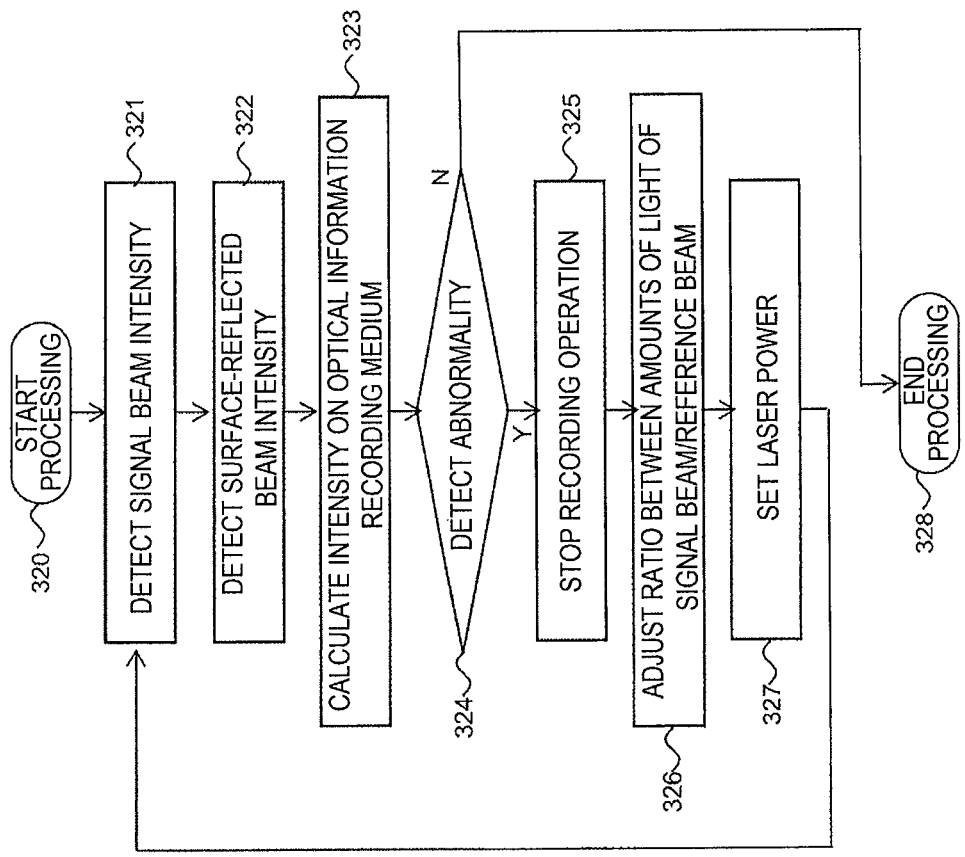
FIG. 14 shows an operation flow in example 5.

As below, one example of feeding back the information of the reference beam acquired as described above to recording/reproduction is shown. FIG. 14 shows an operation flow of the example. The operation is performed at a certain time in recording, e.g. at each time of single page recording, single book recording, or the like. First, the intensity of the surface-reflected beam 303 of the wedge prism 219 is acquired using the photodetector 318 (321). Subsequently, the intensity of the signal beam is acquired using a photodetector 319 (322). 321 and 322 may be performed at the same time or in the reverse order. Then, the intensity of the reference beam and the signal beam on the optical information recording medium 1 is estimated from the acquired intensity of the surface-reflected beam 303 and intensity of the signal beam (323). As a result, when the light intensity on the optical information recording medium 1 is largely different from a target value, the processing enters an abnormality detection operation and the recording operation is stopped (324, 325). Then, the amount of correction of the ratio of amounts of light is calculated from the ratio between the reference beam and the signal beam calculated at 323, and the polarization direction conversion element 204 is adjusted in response thereto (326). Subsequently, the amount of correction of the output intensity of the light source 201 is calculated from the calculated intensity of the reference beam and the signal beam at 323, and an input current is adjusted (327). Then, the processing returns to the signal light intensity detection 321 and performs the above described operation flow again, and thereby, optimizes recording intensity.

According to the example, the luminous flux diameter of the reference beam 207 may be corrected and the surface-reflected beam 303 of the wedge prism 219 may be propagated to the outside of the scanner lens effective diameter 304, and thereby, the problem that the surface-reflected beam 303 of the wedge prism 219 affects holographic recording/reproduction as stray light may be reduced and stable recording/reproduction may be performed. Further, the surface-reflected beam 303 of the wedge prism 219 is acquired by the photodetector 318, and thereby, the optical characteristics of the reference beam may be fed back to recording/reproduction operation and stable recording/reproduction may be performed.

Example 6

Figures 15A, 15B:
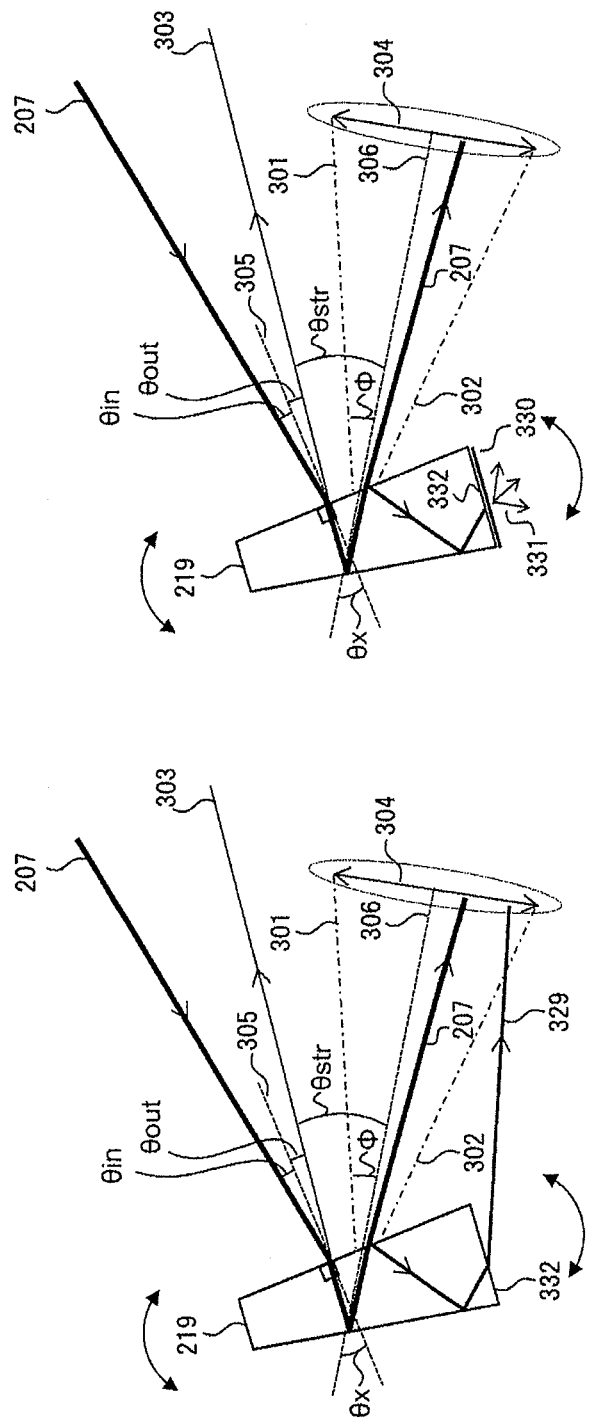
FIGS. 15A and 15B are schematic diagrams showing a configuration of a wedge prism in example 6.

FIGS. 15A and 15B show an optical system of the holographic memory device 10 of the double-luminous flux angular multiplexing system according to the sixth example of the invention. In the example, in comparison to example 1, the recording/reproduction method and the notions about the optical element in the angular multiplexing system are the same, and the example is characterized in that a sand-polished surface 330 as shown in FIG. 15B is provided in the wedge prism 219.

FIG. 15A shows a problem desired to be solved in the example. The reference beam 207 entering the wedge prism 219 is internally reflected by the reflection surface, and then, the most amount of light is output from the output surface. Several percents of the beam is further internally reflected and internally reflected by the reflection surface again, and then, output from a bottom surface 332 of the wedge prism and becomes stray light 329 due to the internal reflected beam. The stray light 329 is problematic because the light enters the scanner lens effective diameter 304 as shown in FIG. 15A and affects recording/reproduction. In order to solve the problem, in the example, as shown in FIG. 15B, the bottom surface 332 of the wedge prism from which the stray light 329 is output is the sand-polished surface 330. Thereby, the stray light 329 becomes diffused light by the sand-polished surface 330, and the amount of stray light 329 entering the scanner lens effective diameter 304 is significantly reduced and the influence on recording/reproduction may be reduced. In the example, the bottom surface 332 of the wedge prism is formed by the sand-polished surface 330, however, a configuration in which blackening treatment for absorbing the stray light 329 is performed on the bottom surface 332 of the wedge prism or the angle of the bottom surface 332 of the wedge prism is set to an angle at which the stray light 329 is output, but does not enter the scanner lens effective diameter 304 within the reference beam angle scan range may be employed.

According to the example, the luminous flux diameter of the reference beam 207 may be corrected and the surface-reflected beam 303 of the wedge prism 219 may be propagated to the outside of the scanner lens effective diameter 304, and thereby, the problem that the surface-reflected beam 303 of the wedge prism 219 affects holographic recording/reproduction as stray light may be reduced and stable recording/reproduction may be performed. Further, the problem that the stray light 329 due to the internal reflected beam as shown in FIG. 15A affects holographic recording/reproduction may be reduced.

Example 7

Figure 16A:
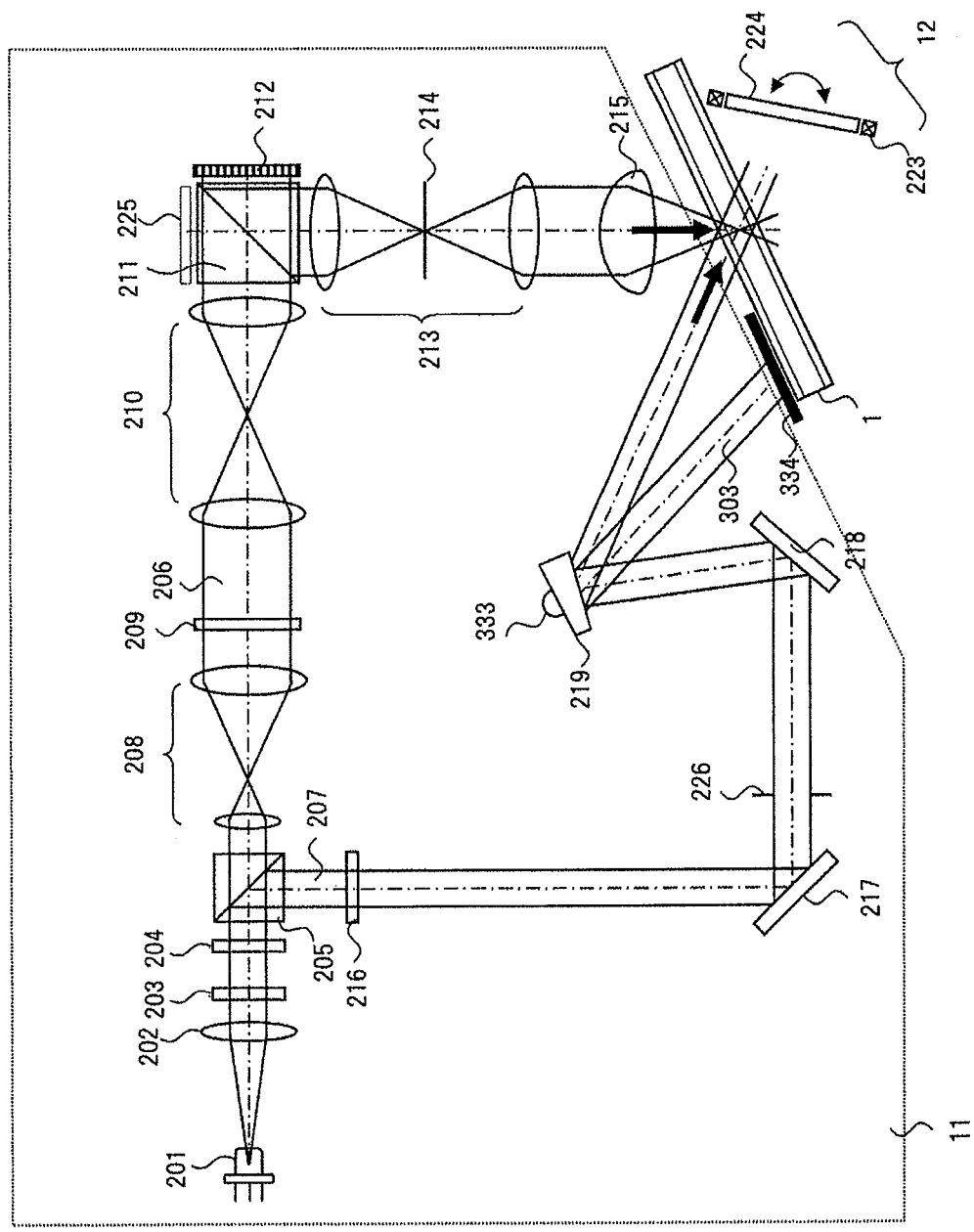
FIG. 16A is a schematic diagram showing an optical system within a holographic memory device in example 7.
Figure 16B:
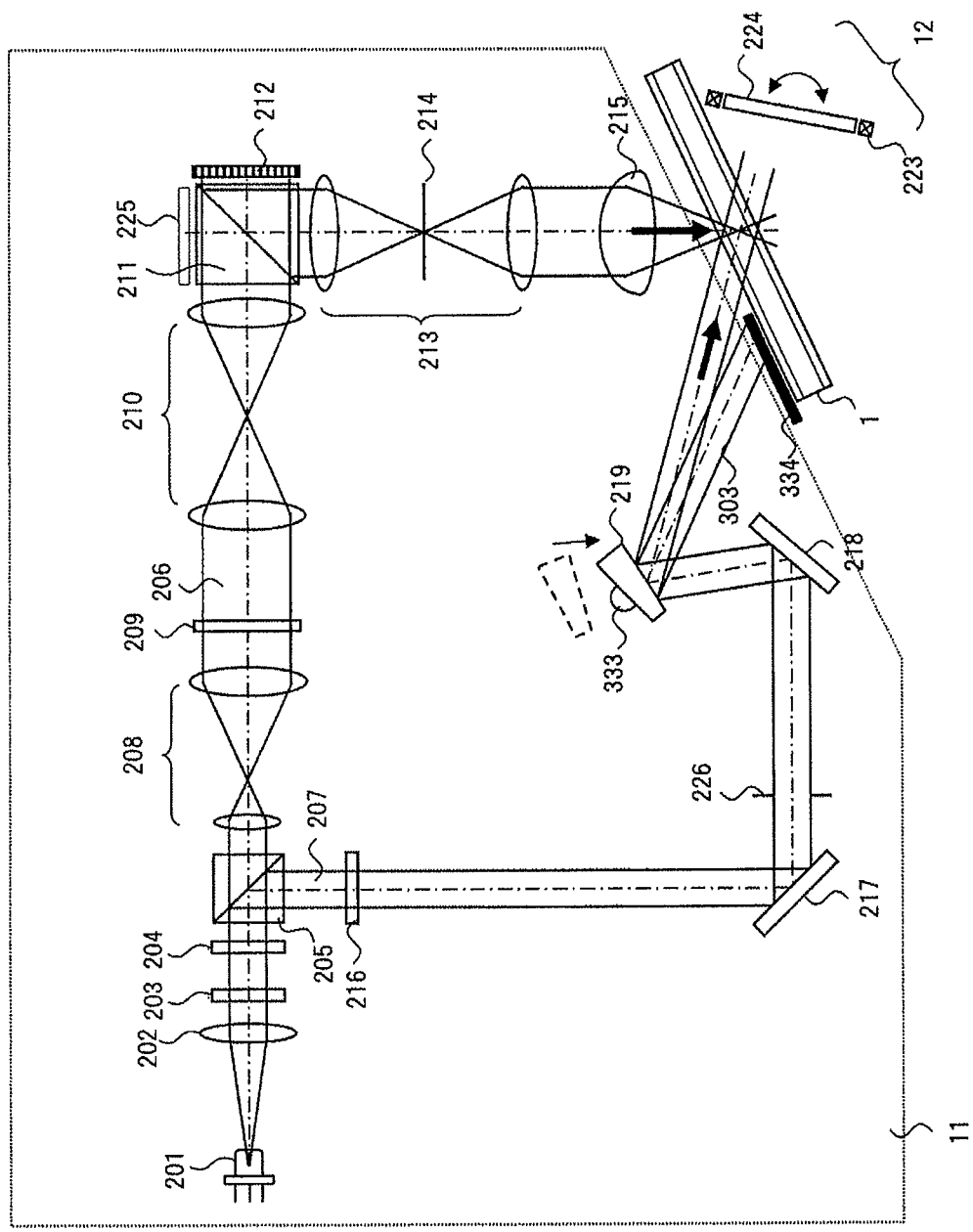
FIG. 16B is a schematic diagram showing the optical system within the holographic memory device in example 7.
Figure 16C:
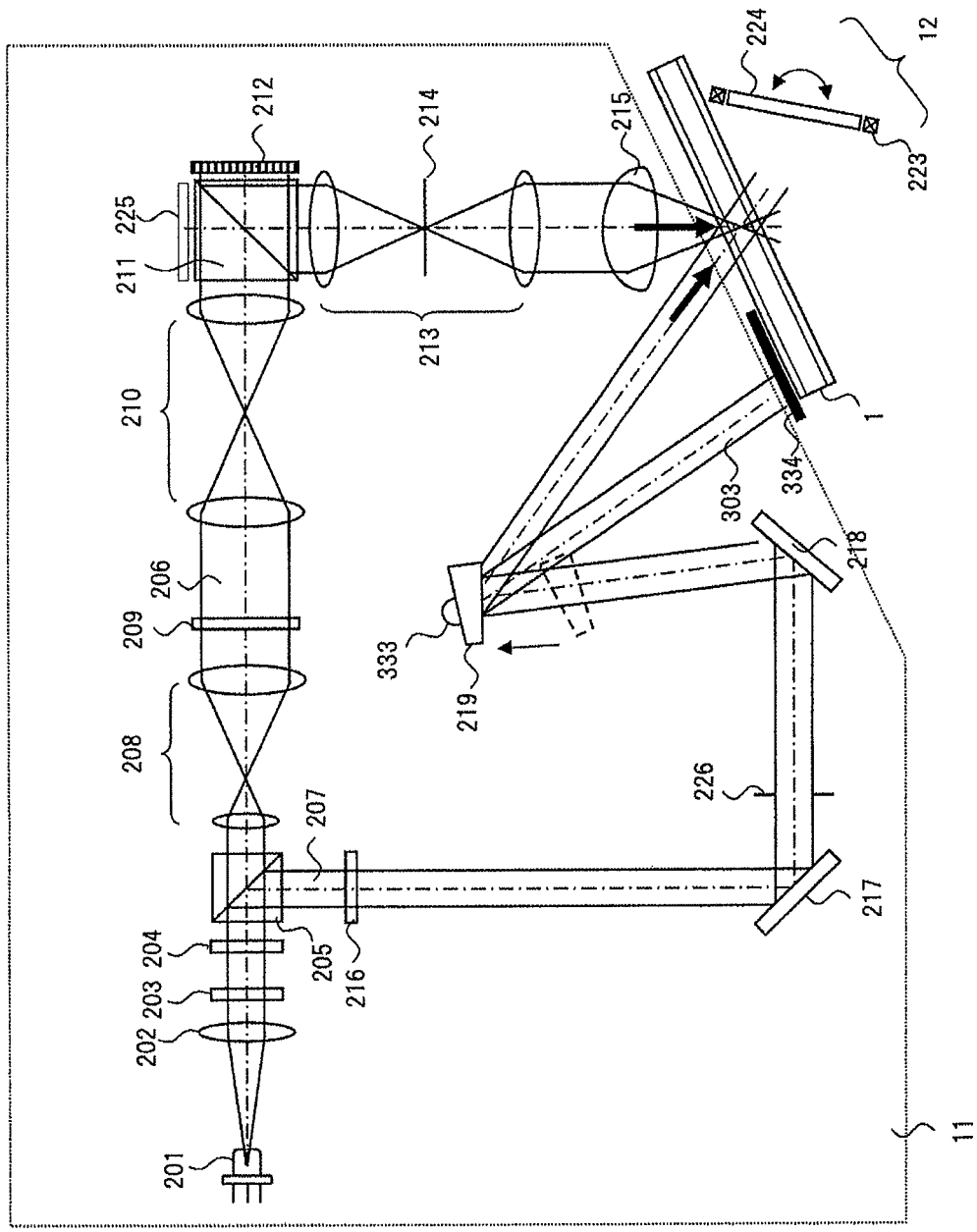
FIG. 16C is a schematic diagram showing the optical system within the holographic memory device in example 7.

FIGS. 16A to 16C show an optical system of the holographic memory device 10 of the double-luminous flux angular multiplexing system according to the seventh example of the invention. In the example, in comparison to example 1, the recording/reproduction method and the notions about the optical element in the angular multiplexing system are the same, and the example is characterized in that angular multiplexing recording is realized by a simple configuration without using the scanner lens 227 by rotating or driving the wedge prism 219 using a rotation drive part 333 as shown in FIG. 16A, and further, a light absorbing filter 334 is provided to prevent generation of unnecessary exposure by exposure of the optical information recording medium 1 to the surface-reflected beam 303 of the wedge prism.

FIG. 16A shows a configuration of the example. In the case where the scanner lens 277 is removed from the configuration of example 1, when the wedge prism 219 rotates and changes the reference beam angle, there is a problem that the exposed position to the reference beam 207 is shifted and the reference beam does not overlap with the signal beam 206 within the optical information recording medium 1. Accordingly, the wedge prism 219 is not only rotated but also moved to a predetermined position at the same time by the rotation drive part 333, and thereby, the exposed position to the reference beam is adjusted to the signal beam 206 within the optical information recording medium 1. For example, when the angle of incidence of the reference beam is a higher angle, the wedge prism 219 is moved as shown in FIG. 16B, and, when the angle is a lower angle, the wedge prism 219 is moved as shown in FIG. 16C.

In the example, there is the problem that the optical information recording medium 1 is exposed to the surface-reflected beam 303 of the wedge prism 219 and unnecessary exposure occurs. Accordingly, the light absorbing filter 334 is provided, and thereby, exposure of the optical information recording medium 1 to the surface-reflected beam 303 within the reference beam angle scan range is avoided.

According to the example, the luminous flux diameter of the reference beam 207 may be corrected and the surface-reflected beam 303 of the wedge prism 219 may be propagated to the outside of the optical information recording medium 1, and thereby, the problem that the surface-reflected beam 303 of the wedge prism 219 causes unnecessary exposure as stray light may be reduced and stable recording/reproduction may be performed.

This applies to stray light generated by the diffraction optical element described in examples 2 to 4 in place of the surface-reflected beam 303 of wedge prism 219.

Note that the above described examples are explained in detail for facilitation of understanding of the invention. Accordingly, the invention is not limited to the above described examples, but includes various modified examples, for instance, not necessarily limited to an example including all of the configurations explained as above. Further, a configuration of another example may be added to a configuration of a certain example. Furthermore, addition, deletion, replacement of other configurations may be made to part of the configurations of the respective examples. In addition, in the examples, the explanation is made with the recording and reproducing apparatus, however, a recording apparatus or reproducing apparatus may be employed.

What is claimed is:

1. A holographic memory device comprising:
   an optical system that generates a reference beam;
   an optical element including a wedge prism that guides the reference beam generated in the optical system to an optical information recording medium at a desired angle of incidence;
   a control part that controls the wedge prism and controls the angle of incidence of the reference beam generated in the optical system to the optical information recording medium; and
   a lens part that images the reference beam controlled in the control part in a desired position of the optical information recording medium,
   wherein the wedge prism is disposed so that the reference beam incident on a surface of the wedge prism is refracted and internally reflected to be output as a first light beam at a first angle that propagates within an effective diameter of the lens part and so that the reference beam incident on a surface of the wedge prism is reflected by the incident surface of the wedge prism and output as a second light beam at a second angle different from the first angle and propagates outside of the effective diameter of the lens part, and
   wherein a direction of taper of the wedge prism is such that an angle θx formed by a normal of an incident surface of the wedge prism and a center axis of the lens part, an angle φ formed by a center axis of the lens part and the first light beam passing through a lens end surface of the lens part, and an angle of incidence θin with respect to a normal of an incident surface of the wedge prism have a relationship of (θx−φ)>θin throughout a reference beam angle scan range in which the angle φ varies from −φ to +φ.

2. A holographic memory device according to claim 1, wherein the direction of taper of the wedge prism is further such that an angle θstr formed by the second light beam and the center axis of the lens part and the angle θ have a relationship of θstr>φ.

3. The holographic memory device according to claim 1, wherein the wedge prism is disposed so that an angle θstr formed by the second light beam and a center axis of the lens part and the angle φ have a relationship of θstr>φ.

4. The holographic memory device according to claim 1, wherein the wedge prism is disposed so that, when the first light beam propagates within the effective diameter of the of the lens part, the second light beam propagates outside of the periphery of the lens part on an opposite side with respect to the center axis of the lens part.

5. The holographic memory device according to claim 1, further comprising a light absorbing filter part that absorbs the second light beam.

6. The holographic memory device according to claim 1, wherein a light blocking part that reduces an influence of a second-order reflected beam is provided on a bottom surface of the wedge prism.

7. The holographic memory device according to claim 1, further comprising:
   a detection part that detects the second light beam; and
   a control part that controls recording or reproduction based on information of optical characteristics of the reference beam detected in the detected part.

* * * * *